G. LEZCANO.
RESILIENT WHEEL FOR VEHICLES.
APPLICATION FILED AUG. 15, 1918.
1,308,761.
Patented July 8, 1919.
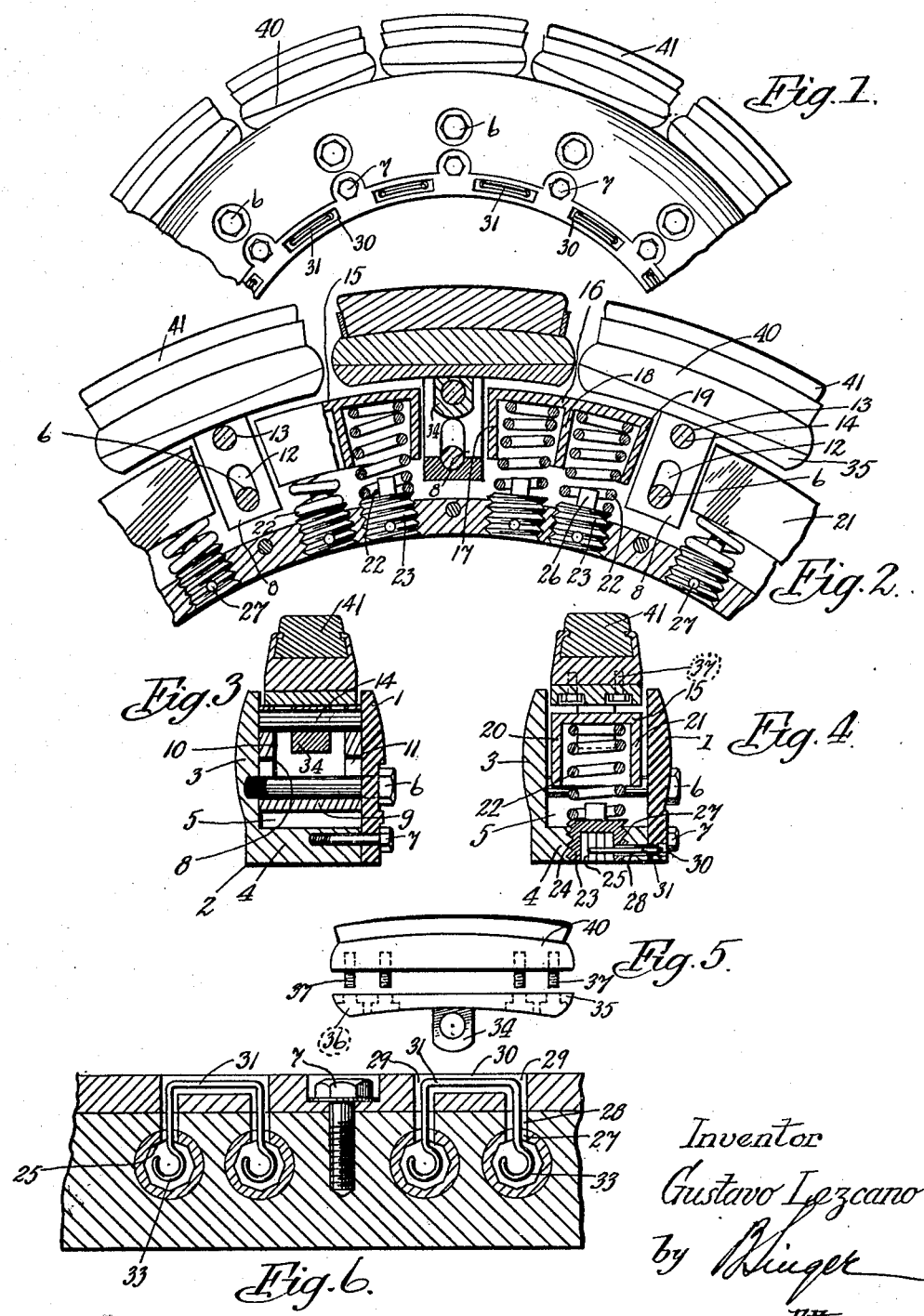
Inventor
Gustavo Lezcano
by Klinger
Attorney.

UNITED STATES PATENT OFFICE.

GUSTAVO LEZCANO, OF HABANA, CUBA.

RESILIENT WHEEL FOR VEHICLES.

1,308,761. Specification of Letters Patent. Patented July 8, 1919.

Application filed August 15, 1918. Serial No. 250,005.

*To all whom it may concern:*

Be it known that I, GUSTAVO LEZCANO, a citizen of the Republic of Cuba, and resident of Habana, Cuba, have invented a new and useful Improvement in Resilient Wheels for Vehicles, of which the following is a specification.

The invention relates to resilient wheels for vehicles and has for its principal object the provision of a wheel which dispenses with the ordinary pneumatic tire without, however, sacrificing the resiliency thereof and without possessing the disadvantages of the same.

It is also an object of the invention to provide a plurality of independent resilient shoes arranged in supports slidably mounted in the wheel rim and controlled by a plurality of springs.

A further object of the invention embraces the provision of casings, slidably arranged in the rim and serving as abutments for springs to be held in contact with the shoe supports.

It is a further object of the invention to provide pressure screws in the bottom of the rim whereby the pressure of the springs may be adjusted.

To the accomplishment of the objects stated and others that will become apparent upon perusal of the specification, the invention comprises the means hereinafter described and particularly pointed out in the appended claims.

In the annexed drawing:

Figure 1 is a fragmentary side view of a wheel rim constructed with my invention.

Fig. 2 is a fragmentary sectional view of the rim with the shoe carrying element shown in spaced relation to the spring impelled casings.

Figs. 3 and 4 are transverse sections of the parts shown in Fig. 2.

Fig. 5 is a detail view of the shoe support and carrier, and

Fig. 6 is an enlarged section to show the means for securing the tensioning means of the springs against rotation.

Referring to the several figures in the drawing, 1 designates an annular plate coacting with an annular member 2 of the form of an angle iron, having the legs 3, 4, respectively extending in vertical and horizontal direction. As shown in Figs. 3 and 4 the ring 1 bears against the outer edge of the leg 4 and is disposed parallel to the vertical leg 3, to define therewith an annular channel 5 opening outwardly to receive and house the parts for resiliently holding a plurality of resilient shoes, arranged in spaced relation and constituting the tread portion of the wheel. The members 1, 2 are interconnected by a series of uniformly distributed bolts 6 arranged at about the central portion thereof and having the heads disposed in recesses of the ring 1. A series of auxiliary bolts 7 enter the leg 4 in threaded engagement therewith and are disposed with their heads in recesses adjacent to the inner edge of the ring 1 to act as additional securing means for the members 1 and 2.

In the channel 5 a plurality of slide members 8 are disposed in spaced relation in respect to one another and each comprising a bottom plate 9 normally maintained at a distance from the leg 4 and side plates 10 and 11 respectively contacting with the leg 3 of member 2 and the ring 1. The side plates 10 and 11 are each provided with a radially extending slot 12 for the passage of the bolt 6 and with an aperture 13 for the passage of a pivot 14, for a purpose hereinafter further explained. The side plates and bottom plate of the member 8 as indicated are preferably formed integral but it is within the scope of the invention to obtain these parts separately and to interconnect the same for the purpose of providing a slide which is functionally integral. By virtue of the provision of the slots in the plates 10, 11, the member 8 can execute a reciprocating movement in radial direction, the engagement between the ends of the slots and the bolt 6 limiting such movement.

Intermediate the slide members 8 casings 15 are arranged which are of box like construction to constitute housings for a plurality of helical springs 22. Each housing or casing 15 is equipped with a top plate 16 having a curvature concentric with the periphery of the wheel and formed with a plurality of radially directed walls 17, 18, 19 which define in conjunction with the side walls 20 and 21 a pair of compartments opening inwardly. Each compartment receives one of the helical springs 22 which bears against the top plate 16 at the outer end and against a pressure screw 23 at the inner end. The horizontal leg 4 of the annular member 2 is equipped with a series of threaded apertures 24 to receive pressure screws 23 arranged in radial alinement with the compartments of the casings 15.

Each screw 23 is hollow to provide an octagonal socket 25, Fig. 6, so as to permit the insertion of a socket key to adjust the screws in radial direction and thereby regulate the tension of the springs 22. As indicated in Fig. 2 the screws 23 are equipped at the outer ends with extensions or pins 26 around which the inner convolutions of the springs are arranged to be guided by the same. According to the drawing a special screw is provided for each helical spring whereby individual adjustment of the springs may be accomplished and the removal of a worn out spring may be conveniently effected without disturbing the other parts of the improved rim.

To lock the screws against rotation such as may occur when vibrations or jarrings of the wheel are engendered each screw is provided with an aperture 27 adapted to register with a passage or port 28 in the leg 4 of member 2 and which port is in alinement with a bore 29 in the annular plate 1. The bores 29 of each pair of screws 23 are interconnected by the recess 30. To secure the screws against rotation, a wire 31 bent into U-shaped form is introduced through the alined ports 29 and 28 and the apertures 27 such that the yoke portion of the wire is received in the recess 30 of the plate 1. The ends 33 of the wire in view of the latter's flexibility are bent upon coming in contact with the walls of the sockets 25 so that the wire due to its bent ends 33 is retained in place and serves as a locking means for the screws 23.

Each pivot pin 14 disposed in the apertures 13 of the side plates 10, 11 of the members 8 also extends through a lug 34 of a cross-head 35 provided with a curved inner face adapted to be engaged by the adjacent portions of the casings 15 which latter are normally held in contact with the cross-head by action of the springs 22 but indicated spaced therefrom in Fig. 2 for the sake of clearness. The outer side of the cross-head 35 is plane and is provided with eight apertures 36 for the reception of a like number of bolts 37 projecting from the bottom of a supporting member 40 acting as a carrier for the shoe 41 of solid rubber or of other suitable or approved material. The carrier 40 is provided with means for holding the shoe in proper position.

In the operation, the casings 15 of the springs 22 are held between the leg 3 of the annular member 2 and the plate 1 by the cross-heads or bearing members 35, secured to the members 8. The cross-heads 35 are normally in engagement with the casings 15 and transmit thereto the pressure engendered during rotation of the wheel. This pressure is absorbed by springs permitting an inward, radial movement of the casings and the cross-heads 35 similarly move radially inwardly by virtue of the members 8 being capable of sliding on the bolts 6 which act as guiding means of the slide members 8. As soon as the pressure ceases, the springs rebound and eject the casings 15 outwardly, carrying along the appertaining cross-heads 35.

If any of the springs 22 becomes damaged or loses its resiliency, a new spring may be substituted by the simple operation of removing the respective pressure screw 23 from the flange 4, subsequent to the removal of the wire which holds the screw against rotation. After the removal of the screw the spring may be extracted from the compartment of the casing 15 and a new spring inserted. Subsequently the screw 23 is threaded into the leg of flange 4 by means of a socket key and the new spring tensioned as required.

The provision of a plurality of independent shoes 41 entails the advantage of convenient removal of a defective shoe and substitution thereof by a new one, such that the cost of upkeep of the tire is reduced to a minimum. To replace a defective shoe the carrier 40 is removed from the cross head 35 by loosening the nuts of the bolts 37. Another carrier already equipped with the shoe and carried in stock will then be placed on the cross-head 35 and secured thereto without appreciable loss of time, so that no serious interruption in driving is experienced. The improved rim can be utilized in connection with passenger cars or with trucks or can be applied to the wheels of any vehicle whenever resiliency of the wheels forms a requirement.

In the drawing the preferred embodiment of the invention has been shown by way of example. Various changes and modifications can readily be conceived without departing from the scope of the invention and it is therefore my intention of including all alterations within the purview of my invention as indicated in the appended claims.

I claim:

1. In combination with a wheel rim formed with an annular outwardly opening channel, a plurality of independent resilient shoes constituting the tread, carriers for said shoes, bearing members detachably secured to said carriers, slide members secured in said channel and secured to said bearing members, resilient means arranged in said channel for opposing movement of said bearing members, means for tensioning said resilient means, and means for securing said tensioning means in adjusted position.

2. In combination with a wheel rim having an outwardly opening annular channel, a plurality of independent resilient shoes constituting the tread, carriers for said shoes, bearing members detachably secured to said carriers, slide members arranged in said channel and connected to said bearing members, casings, arranged in said channel between said slide members and adapted to engage the inner face of said bearing members, resilient means for maintaining the casings in engagement with said bearing members, means for tensioning said resilient means, and means for securing said tensioning means in adjusted position.

3. In combination with a wheel rim having an outwardly opening annular channel, a plurality of resilient shoes arranged adjacent to said wheel rim and constituting the tread, carriers for said shoes, bearing members detachably secured to said carriers, slide members arranged in said channel and connected with the central portion of said bearing members, casings at both sides of said slide members adapted to engage adjacent portions of the inner side of said bearing members, resilient means for maintaining said casings in engagement with said bearing members, means for tensioning said resilient means, and means for securing said tensioning means in adjusted position.

4. In combination with a wheel rim, having an outwardly opening annular channel, a plurality of spaced resilient shoes arranged adjacent to said wheel rim and constituting the tread, carriers for said shoes, bearing members detachably secured to said carriers, retaining members arranged in said channel and adapted to execute a radial reciprocating movement, said members being connected with the central portion of said bearing members, casings at both sides of said retaining members adapted to engage adjacent portions of the inner side of said bearing members, springs forcing said casings into engagement with said bearing members, means for adjusting the tension of said springs and means for securing said last named means in adjusted position.

5. In combination with a wheel rim having an outwardly opening annular channel, a plurality of spaced resilient shoes arranged adjacent to said wheel rim and constituting the tread, carriers for said shoes, bearing members detachably secured to said carriers, retaining members arranged in said channel adapted to execute a radial reciprocating movement, said members being connected with the central portion of said bearing members, casings at both sides of said retaining members adapted to engage adjacent portions of the inner side of said bearing members, springs forcing said casings into engagement with said bearing members, screws arranged in said rim and projecting into the channel to serve as adjustable abutments for said springs and means for securing said screws in adjusted position.

6. In combination with a wheel rim, having an outwardly opening annular channel, a plurality of spaced resilient shoes arranged adjacent to said wheel rim and constituting the tread, carriers for said shoes, bearing members detachably secured to said carriers, retaining members arranged in said channel adapted to execute a radial reciprocating movement, said members being connected with the central portion of said bearing members, casings at both sides of said retaining members adapted to engage adjacent portions of the inner side of said bearing members, springs forcing said casings into engagement with said bearing members, hollow screws arranged in said rim and projecting into the channel to serve as adjustable abutments for said springs, and means for securing said screws against rotation.

In witness whereof I affix my signature.

GUSTAVO LEZCANO.